United States Patent [19]
Egli

[11] 3,785,058
[45] Jan. 15, 1974

[54] APPARATUS FOR AND METHOD OF CALIBRATING WORKPIECE SENSOR AND FOR ALIGNING SENSOR AND WORKPIECE

[76] Inventor: Henry O. Egli, 76 Riverside Dr., Sidney, N.Y.

[22] Filed: May 13, 1971

[21] Appl. No.: 143,020

[52] U.S. Cl. .................................................. 33/172 D
[51] Int. Cl. .......................... B23b 49/00, G01b 5/02
[58] Field of Search .................. 33/172 B, 172 D, 33/185 R, 181 R, 169 C

[56] References Cited
UNITED STATES PATENTS

| | | | |
|---|---|---|---|
| 2,859,531 | 11/1958 | Maller | 33/172 D |
| 2,649,783 | 6/1950 | Baugh | 33/172 D |
| 3,216,119 | 2/1964 | Street | 33/172 D |
| 3,507,047 | 4/1970 | Stadele | 33/172 D |
| 2,860,418 | 11/1958 | Johnson | 33/172 D |

Primary Examiner—Stanley N. Gilreath
Assistant Examiner—Jon W. Henry
Attorney—Ostrolenk, Faber, Gerb & Soffen

[57] ABSTRACT

Machine tool and workpiece alignment apparatus using a sensing element connected with a sensitive indicator to align the sensing element both with the centerline of the tool spindle and with a location on the workpiece. The sensing element is offset positioned to sense thin workpieces. A recalibration assembly is attached to the apparatus for being periodically moved into engagement with the sensing element to facilitate recalibration. Methods of initially calibrating and of recalibrating the apparatus are also disclosed.

13 Claims, 6 Drawing Figures

PATENTED JAN 15 1974

3,785,058

INVENTOR.
HENRY O. EGLI
BY
Ostrolenk, Faber, Gerb & Soffen
ATTORNEYS

APPARATUS FOR AND METHOD OF CALIBRATING WORKPIECE SENSOR AND FOR ALIGNING SENSOR AND WORKPIECE

The present invention relates to establishing machine tool table settings and particularly relates to means for and a method of ensuring that a machine tool spindle center line is at precise coincidence with an edge or other desired feature of a particular workpiece.

Every machine tool spindle and every tool holder used within the spindle has unique tolerances, e.g., it may be bent, have an eccentric shaft, have uneven bearings, etc. Consequently, workpieces to be bored, milled or otherwise worked by the machine tool must be accurately positioned with respect to the true center line of the spindle of the tool. First, the spindle center line must be determined and then the workpiece must be aligned correctly with the spindle. Thereafter, additional table settings can readily be made.

The prior art teaches various apparatus to be secured to the spindle for accurately determining a spindle center line and for aligning the center line with a particular location on a workpiece. Usually, both purposes are realized in a single operation. Generically, this apparatus is referred to as an edge finder. But it can sense the edge of a workpiece, and any other location on the workpiece, as desired. Prior art edge finders have drawbacks. None can be initially calibrated so that all workpiece sensing measurements are performed identically starting from the same point in a needlessly prolonged manner. Some prior art techniques rely upon only the sense of feel, i.e., the manual perception of resistance to the further movement of the workpiece sensing element or pin with respect to the workpiece, in determining that there is proper alignment with the workpiece. Where the sensing element is rigid, as it frequently is where a sense of feel is relied upon, the element can damage the machine tool spindle bearings, especially because an overrun in establishing contact can produce significant pressure on the spindle.

Two examples of prior art devices having at least some of the drawbacks noted above are now described. A vertical pin type of workpiece alignment device or edge finder is the simplest device of this type now used. The side of the pin is brought into engagement with the edge or other workpiece location to be sensed and the location is determined by feel. This method has the drawbacks of possible overrun and of having to account for pin thickness. The concentricity error of the pin relative to the spindle axis must be considered. The maximum expectable coincidence of the edge found with the actual center line of the spindle would be restricted to 0.001 inch.

A step block device may be used. A block of a first width is of a shorter overall height through half of its width and is of a greater overall height for the other half of its width, thereby forming the block into an L-shape. The shorter height portion of the block (horizontal leg of the L) has its lower surface against the upper surface of the workpiece and is clamped at the vertical edge of the workpiece. The greater height portion hangs off the edge of the workpiece (vertical leg of L hangs down), its lower surface is below the lower surface of the other portion of the block and its vertical surface is seated against the vertical edge of the workpiece. The junction of the taller and shorter portions is halfway through the block and is aligned with the workpiece edge. The outer surfaces of the full thickness of the block are sensed in two readings with a block surface sensing means, which is secured to the spindle. One reading is on one surface of the step block and the other, after 180° rotation of the sensing means, is on the opposite surface of the step block. By trial and error, the workpiece supporting the step block is eventually trammed into a position such that the sensing element rotates on a diameter equal to the overall block thickness. Spindle center point readings on both sides of the block are repeatedly taken until the same center point reading is obtained from both sides. When this occurs, coincidence between the spindle center line and the workpiece edge has been established. For recalibrating the indicator for the next workpiece edge, however, the same large number of readings must be taken. The step block method is accurate only to the same extent as the pin type edge finder, on the order of 0.001 inch.

The apparatus of the present invention is adapted to provide a preset sensing element to workpiece contact point to establish and later reestablish an indicator reading for workpiece location and tool spindle center line coincidence. In this description, the particular workpiece location being aligned with the spindle center line is its edge. However, the techniques hereof are equally useful with other locations on the workpiece.

The apparatus of the invention includes a body, which is secured to the tool spindle. Depending from the body is an edge sensing element, comprising a horizontal pin, which faces radially inward with respect to the spindle. The inward facing tip of the pin contacts the edge to be sensed and also contacts both the calibrating and the recalibrating means, described below. The sensing element pin is connected to a conventional position indicating device, which may be of the mechanical or the electronic varieties, for example. When the pin contacts an object, the indicator provides a reading as to the extent to which the sensing element pin has shifted. Through the use of a sensitive indicator, rather than relying upon the sense of feel, and through the use of a sensing element pin, which can shift, even though minutely, under the pressure of contacting an object, like the edge of the workpiece, there is no damage to the indicating mechanism or machine tool after repeated edge finding operations.

A bracket supports the sensing element pin offset from the indicator and from the body of the apparatus and causes the pin to be substantially the lowermost part of the apparatus. This permits sensing the edges of shallow depth workpieces, e.g., thin plates or workpieces, or small projections of the workpieces above the jaws of a vise, etc.

To initially calibrate the sensing element pin so that its contact tip is aligned with the center line of the spindle, a calibration assembly may be used. It is comprised of a set of calibrating blocks, which are secured together. The mating surfaces of the blocks are carefully lapped quite flat and are essentially coplanar.

At a first orientation of the apparatus, the pin tip is brought into engagement with one of the mating surfaces and a null reading is determined on the indicator. Then the entire apparatus is raised, its body is rotated 180° by rotation of the spindle, the pin tip is brought into engagement with the other mating surface and another null reading is determined. The position of the coplanar mating surfaces is readjusted until a common null reading is obtained for both mating surfaces. Then the bezel of the indicator is adjusted so that when the tip of the pin is aligned at the center line of the spindle, the common null reading appears on the indicator as a zero or base dial indicator reading.

The invention includes a recalibration or memory assembly which may be secured to the apparatus body and which is readily shifted into and out of an operative position, for recalibrating the sensing element pin after a period of time or after the apparatus has been repeatedly used for a number of edge determinations. To the apparatus body is secured a first block with a mating surface. Pivotally clamped to the first block is a second block with a cooperating mating surface. The mating surfaces are carefully lapped flat to cause the calibrating means surface, described next, to be always at the identical position when it is clamped where it is being engaged by the sensing element pin. Mounted in the pivoting block is an adjustably positionable calibrating means for the sensing element pin. It is comprised of a flat surface located to be opposite the sensing element pin tip, and adjustable into engagement with the pin tip when the pin is at the zero dial indicator reading position. After the position of the recalibration means surface has been adjusted so that in contacting the pin tip it produces the null indicator reading, the pivoting block supporting the surface is unclamped and moved so as to shift the surface away from the sensing element pin tip. Normal workpiece location finding measurements are made.

When it is desired to check the correctness of the setting of the zero or base dial indicator reading for the sensing element pin tip, i.e., to recalibrate the tip, the recalibration means surface is clamped at the position opposite the sensing element pin tip, and a reading is made on the indicator to determine whether the pin is still at the zero dial indicator reading. If the pin has shifted, a null reading will not be obtained and it will be necessary to recalibrate the dial indicator by shifting the bezel back to a zero or base dial indicator reading. If the pin is still accurately positioned, then the recalibrating means is merely moved out of the way and further workpiece location finding measurements can be taken. This simplified recalibration is to be contrasted with the prior art where recalibration requires the same complex procedures as initial calibration.

Accordingly, it is the primary object of the present invention to provide an improved apparatus for machine tool spindle alignment and workpiece location sensing.

Another object of the present invention is to facilitate calibration of an apparatus for machine tool spindle alignment and workpiece location sensing.

It is another object of the present invention to provide an apparatus for machine tool spindle alignment and workpiece location sensing, which is more sensitive and less prone to become damaged than similar apparatus, which rely upon a sense of feel for sensing the location.

It is a further object of the present invention to provide an apparatus for machine tool spindle alignment and workpiece location sensing, which is adaptable for finding locations on thin workpieces.

It is another object of the invention to provide a method for calibrating and later recalibrating an apparatus for machine tool spindle alignment and workpiece location sensing.

These and other objects of the present invention will become apparent from the following description of the accompanying drawings, in which.

Figure 1:
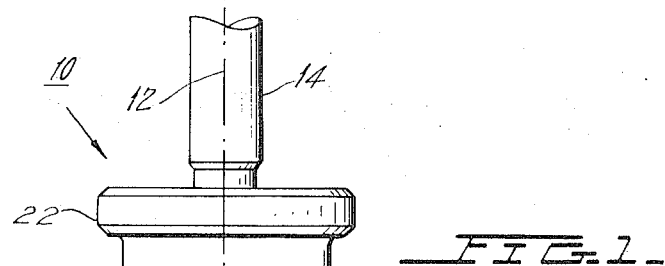
FIG. 1 is a front elevation of an apparatus in accordance with the invention in position to sense workpiece edges.
Figure 4:
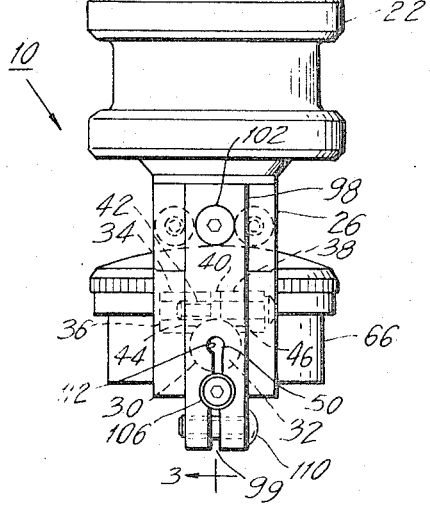
FIG. 4 is a partial view of a workpiece in conjunction with which the apparatus is used.
Figure 4:
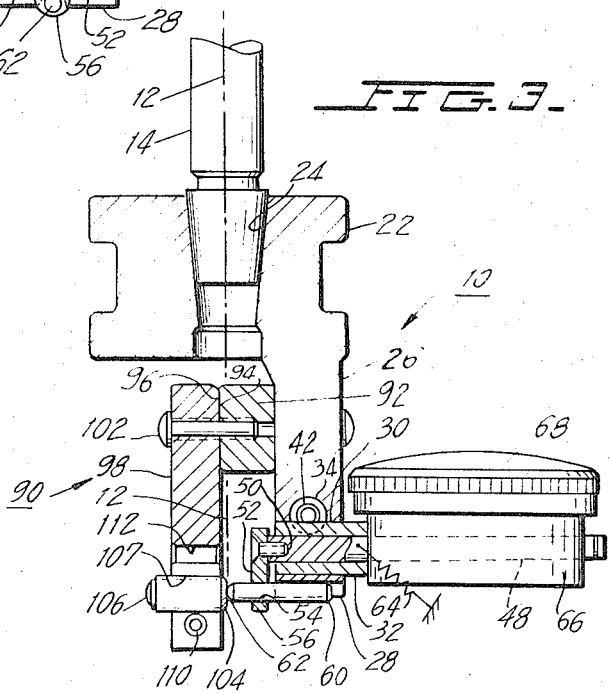

Turning to the drawings, and particularly to FIG. 1, apparatus 10, designed in accordance with the present invention, aligns the true center line 12 of the machine tool spindle with vertical edge 16 (FIG. 4) of the workpiece 18, which is supported on and clamped to machine slide 20. Workpiece 18 is standard and may be a block of metal, or the like. Machine slide 20 is a conventional workpiece support apparatus, which is trammable in two mutually perpendicular directions to shift the workpiece with respect to the stationary machine tool shank.

Figure 3:
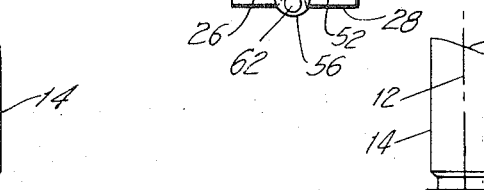
FIG. 3 is a view, partially cross-sectioned, of the apparatus of FIG. 2 along the lines in the direction of arrows 3 in FIG. 2.

Turning to FIG. 3, apparatus 10 includes a body 22 with a central tapered socket 24, of a type known in the machine tool trade as a Jacobs Taper. The socket can receive any standard size machine tool spindle shank 14 for rigidly supporting body 22 on shank 14. Shank 14 is subsequently attached to the machine spindle (not shown).

Figure 2:
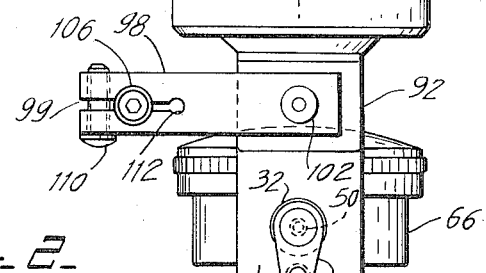
FIG. 2 is a view of the apparatus of FIG. 1 when the zero or base dial indicator reading is being checked.

Turning to FIGS. 1 and 3, eccentric to and depending from body 22 is the edge sensing means support and recalibration means support leg 26. Near lower end 28 of leg 26 is bored an opening 30 for receiving and holding rigid indicator shank 32. Turning to FIGS. 2 and 3, for clamping shank 32 in position, there is a bore 34, which passes through leg 26 transversely to bore 30. Bore 34 partially intersects bore 30 over, for example, an arc of about 60° of bore 30. Within bore 34 are positioned two indicator stem clamping pieces 36, 38, which are separated by gap 40. Each piece 36, 38 includes a respective cut out 44, 46, on a radius contoured to the indicator stem surface. Piece 36 is internally threaded and piece 38 is relief drilled to receive and cooperate with tightening screw 42, such that upon tightening of screw 42, pieces 36, 38 are drawn together to partially close gap 40 and thereby press shank 32 into the wall of its bore 30 and hold it in position. Passing through shank 32 is indicator means operating stem 48, which leads to indicator means 66, described below.

Secured to one end of indicator stem 48 by flat head screw 50 is sensing element pin offset bracket 52. Within opening 54, which is located as close as practicable to lower end 56 of offset bracket 52 and at least as low, and preferably slightly lower than, lower end 28 of leg 26, is press fitted edge sensing element pin 60. Because pin 60 is essentially the lowermost part of apparatus 10, the edges of thin workpieces 18 can be sensed. Pin 60 is rigid and has a hard, metallic, spherical contact tip 62, which is the only portion of the apparatus that contacts a workpiece.

A very light force biasing means 64 presses against indicator stem 48, thereby to shift pin tip 62 into engagement with a surface to be sensed. By means of bracket 52 and indicator stem 48, pin 60 is connected with conventional dial faced indicator 66, which has a bezel 68 for adjusting the scale on the dial face. For example, indicator 66 may have a pinion gear arrangement within it, which is associated with a rotating indicator hand. Indicator stem 48 would contain an integral rack that meshes with the pinion gear arrangement, and movement of stem 48 thereby rotates the indicator hand around the dial face.

The first function to be performed with the edge finder is to align the contact surface of tip 62 with spindle center line 12. A first reading of the position of tip 62 at one orientation of pin 60 when it is in a plane is taken on indicator 66. Then, a second reading on indicator 66 is taken with tip 62 in the same plane and at an orientation, which is 180° away from its orientation during the initial reading. When the readings from two diametrically opposed positions of tip 62 are coincident on the dial face, a null position for pin 60 has been found, which is coincident with the actual location of center line 12 of the spindle. Bezel 68 is now adjusted so that the dial face zero or base reading is coincident with the two coincident null readings. Thereafter, when tip 62 contacts a workpiece edge and indicator 66 indicates that tip 62 is at the null position, that workpiece edge is aligned with spindle center line 12.

Unlike the fixed pin and other types of edge finders, which rely solely on the sense of feel, the present invention uses a sensitive indicator to provide readings, which indicate when pin tip 62 is appropriately aligned and which later indicate that an edge has been found. The present invention can establish coincidence of workpiece edge and spindle center line within 0.000010 inch if the spindle and indicator used are accurate within this dimension.

Figure 5:
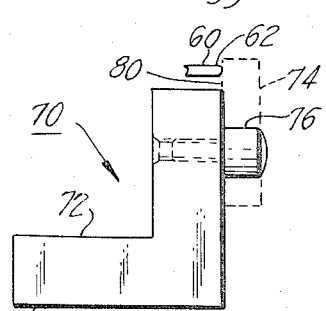
FIGS. 5 and 6 are, respectively, side and front views of a calibration block assembly for the apparatus.
Figure 6:
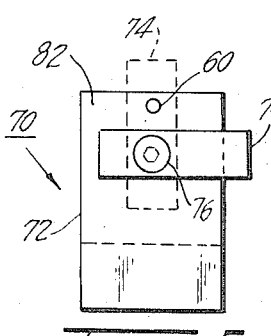

To provide the two coincident readings using pin 60, which are required for calibrating the pin, calibration block assembly 70 of FIGS. 5 and 6, is provided. The assembly is comprised of angle block 72 and pivotable set block 74. The mating faces of these two blocks are lapped for flatness within five millionths of an inch over the entire mating surfaces. A tightenable clamping screw 76 holds the mating surfaces of blocks 72, 74 securely together. Screw 76 is loosened to permit set block 74 to be pivoted between its vertical position shown in dashed lines and its horizontal position shown in solid lines.

Base 78 of angle block 72 is clamped to the machine tool table or machine slide. The machine spindle and, therefore, shank 14, which were elevated to raise apparatus 10 away from calibration block assembly 70, is lowered. Block assembly 70 is moved to the position of FIG. 5 to enable pin tip 62 to contact the lapped face 80 of upright set block 74. When tip 62 contacts surface 80, the reading on indicator 66 is noted. The spindle is then raised and rotated 180°, which rotates indicator pin 60 to the same extent. Step block 74 is unclamped, rotated horizontally, to its position of FIG. 6, and reclamped. This exposes lapped face 82 of angle block 72. The spindle is now lowered, pin tip 62 contacts face 82, and another reading is made on indicator 66. Because faces 80, 82 are lapped and because blocks 72, 74 are held securely together, faces 80, 82 are essentially coplanar, whereby the readings on indicator 66 at the diametrically opposed positionings of pin 60 are essentially made on opposite sides of the same plane.

If the two opposite readings for pin 60 on indicating means 66 are not coincident, the machine tool table is adjusted by one-half the difference between the two readings. The two readings are then repeated. When the two null readings are identical, indicator bezel 68 is adjusted so that the point of coincidence on indicator 66 becomes a zero or base indicator reading.

The foregoing procedure establishes a base reading for the true spindle center line for a particular combination of machine tool, tool holder, edge finder shank and sensing element pin position. As long as this particular combination remains unchanged, the base reading will be valid unless the null position for the dial indicator is altered by rough handling or inadvertent shifting of pin 60.

In the prior art, when any of the above factors is varied, it is necessary to repeat the time consuming original measurements with the sensing element which, at the least, will require two readings and will probably also require adjustment and at least one additional set of two readings.

To eliminate this needless waste of time, the apparatus of the present invention includes its own recalibration assembly 90. With this assembly, only a single, quickly obtained dial reading is required to confirm that the pin position readings on indicator 66 are coordinated so that the center line 12 of the spindle is aligned with the zero or base reading on indicator 66. Furthermore, because recalibration assembly 90 is incorporated in the apparatus, it is not necessary to reassemble a separate calibration block assembly, like 70, on the machine tool table before recalibrating the apparatus, as required in the prior art.

Recalibration assembly 90 includes a fixed spacer block 92, which on one surface is secured to leg 26 and on its outer surface 94 is closely lapped to mate with the similarly closing lapped mating surface 96 of pivotable block 98. Block 98 is bifurcated and has a gap 99 between its two sections. Clamping screw means 102 holds blocks 92, 98 securely together in either the calibration assembly normally inoperative position of FIG. 1, or its operative position of FIGS. 2, 3.

After pin 60 is calibrated, and before any edge finding or workpiece sensing is done with apparatus 10 or any outside force acts upon pin 60 or indicator 66, recalibration assembly 90 is adjusted to remember the null position of pin 60.

Screw means 102 is released sufficiently to permit block 98 to be pivoted from its horizontal position of FIG. 1 to its vertically depending position of FIGS. 2, 3 and until flat surface 104 of calibration screw 106 is opposite indicator pin tip 62. Screw 102 can be retightened to hold this position. Calibration screw 106 has a very fine thread and passes through a cooperatingly threaded opening 107 through block 98. The fine thread assures that very fine adjustments of screw 106 can be made for great accuracy.

Locking screw 110 is tightened to squeeze the sections of bifurcated block 98 securely against calibration screw 106 to prevent its rotation. When screw 110 is loosened and surface 104 of screw 106 is opposite pin tip 62, the position of screw 106 is adjusted until the reading on indicator 66 indicates that tip 62 is at the previously established zero or base position. Then locking screw 110 is retightened. Block 98 is returned to its horizontal position of FIG. 1.

Whenever recalibration of indicator 66 is required, block 98 is pivoted to its position of FIGS. 2 and 3 so that surface 104 of screw 106 is opposite pin tip 62 and screw 102 is tightened to clamp block 98 in this position. If pin 60 has not shifted, its tip 62 should contact surface 104. If it has shifted, it can be adjusted so that its tip contacts surface 104. With tip 62 in contact with surface 104, the reading on indicator 66 is checked. If it is other than zero or base reading, the operator must adjust the reading of indicator 66 by rotating bezel 68 until the zero or base indicator reading is again established. This simple readjustment of the bezel is sufficient because surface 104 has never shifted and is, therefore, at the properly aligned position.

With the present invention, recalibration of the apparatus can be readily performed with a single simple recalibration measurement. This is to be distinguished from the prior art where two or more time consuming comparative measurements must be made.

In a typical prior art situation, when a workpiece is set on a boring or milling machine, the first step is to tram the edge of the workpiece and adjust its position until it is clamped parallel with the axis of table travel. Normally, a separate dial indicator held in the machine spindle is used for this operation. The second step is to establish table settings for the workpiece edges. With prior art apparatus, two distinct operations are required to accomplish the settings. With the apparatus of the present invention, a single tool handling provides for both steps.

Once pin 60, indicator 66 and recalibration assembly 90 have been properly set, to determine an edge on workpiece 18, the spindle is lowered until indicator pin tip 62 is next to the edge 16 of workpiece 18. Then machine slide 20 is moved until workpiece edge 16 contacts and moves pin tip 62 and thereby indicator stem 48 until a zero reading is established on indicator 66. At this time, the edge is aligned with center line 12 of the tool spindle.

For a typical workpiece, where dial readings for two edges are normally established, a time saving on the order of ten minutes would be gained by using the present invention.

There has just been described a novel spindle center line determining and workpiece location determining apparatus having a number of significant features, including an offset workpiece sensing element pin 60, which is able to take edge readings on quite thin workpieces, a sensitive position indicator, which does not rely upon the sense of feel to properly calibrate the apparatus or to determine when a workpiece location is aligned with the machine tool spindle shank and, most important, a simple recalibration assembly attached to the apparatus for checking the accuracy of its settings and for recalibrating it in the event that any inaccuracy develops.

Although this invention has been described with respect to its preferred embodiments, it should be understood that many variations and modifications will now be obvious to those skilled in the art. It is preferred, therefore, that the scope of the invention be limited not by the specific disclosure herein, but only by the appended claims.

I claim:

1. In an apparatus for aligning the center line of a rotatable spindle with a workpiece location, wherein said apparatus comprises:

a body; means for connecting said body to a spindle, whereby said body rotates with that spindle;

a workpiece sensing element connected to and supported by said body for being contacted by the location on the workpiece to be sensed;

the improvement comprising, a workpiece sensing element recalibration assembly secured to said body, for recalibrating said sensing element to its original calibration after it was once calibrated, comprising:

a block including a surface; said block being movable selectively into a constant preselected position with respect to said sensing element; means for thereafter moving said sensing element into engagement with said recalibration means surface and for thereafter moving said sensing element out of engagement with said recalibration means;

means for sensing the location of the engagement between said recalibration means surface and said sensing element to determine whether said sensing element has shifted in position from a previous, preselected, calibrated position;

said surface being part of an adjustable element, which is adjustable in position with respect to both said block and said sensing element for being adjusted to a position such that when said sensing element contacts said surface, said sensing element is at said preselected position.

2. In the alignment apparatus of claim 1, the improvement further comprising, said location sensing means comprises a position indicator device connected to said sensing element for sensing and indicating the position of said sensing element;

said sensing element being shiftable with respect to said body when it is engaged by a workpiece or by said sensing element recalibration means surface, thereby to preclude damage from spindle overrun, and the like.

3. In the alignment apparatus of claim 2, the improvement further comprising, said sensing element comprising a pin having a tip which is transverse to said spindle and is the part of said sensing element engaged by said recalibration means surface; said pin being longitudinally shiftable.

4. In the alignment apparatus of claim 2, the improvement further comprising, said block having a mounting engagement surface; said body carrying a mating mounting engagement surface; said block being mounted to said body through engagement of said mounting engagement surfaces; both said mounting engagement surfaces being lapped very flat to ensure that when said recalibration means surface is shifted to be in engagement with said sensing element, that said surface is always moved to the same position with respect to said sensing element.

5. In the alignment apparatus of claim 4, wherein said body includes a depending arm that extends down from said body; means carried on said arm for supporting said sensing element;

the improvement further comprising, said sensing element being supported by a bracket positioned and shaped such that said sensing element is at least in part below said body arm; said body arm being the lowermost part of said apparatus besides said sensing element when said apparatus is used to sense a workpiece, whereby thin width workpieces can be sensed.

6. In the alignment apparatus of claim 2, the improvement further comprising,
said location sensing means including an indicator which indicates the position of said sensing element, and an adjustable bezel for establishing a base reading for the indicator for assessing subsequent readings on the indicator.

7. A method of calibrating an apparatus to align the center line of a rotatable spindle to which the apparatus is attached with a sensing element of the apparatus, comprising the steps of:
holding a first surface facing in a first direction in a plane; engaging the first surface against the sensing element; sensing the position of the sensing element and indicating that position;
rotating the sensing element to a position 180° away from its first position;
holding a second surface in a direction opposite the first direction in the same plane; engaging the second surface against the sensing element; sensing the position of the sensing element and indicating that position;
comparing the two indications to determine whether they are equal.

8. The method of calibrating an apparatus of claim 7, wherein if the two indications are not equal, the location of the plane of the first and second surfaces is shifted one half the distance which the indications indicate that the first and second surfaces appear to be separated and in the direction which causes the indicated positions to move to equality.

9. A method of recalibrating an apparatus to realign the center line of a rotatable spindle to which the apparatus is attached with a sensing element of the apparatus, comprising the steps of:
holding a first surface facing in a first direction in a plane; engaging the first surface against the sensing element; sensing the position of the sensing element and indicating that position; rotating the sensing element to a position 180° away from its first position; holding a second surface in a direction opposite the first direction in the same plane; engaging the second surface against the sensing element; sensing the position of the sensing element and indicating that position; comparing the two indications to determine whether they are equal;
after the sensing element has been calibrated, moving a recalibration surface, which can be held at a fixed location with respect to the sensing element whenever the recalibration surface is moved to be in engagement with the sensing element, into a position facing the sensing element;
moving the recalibration surface into engagement with the calibrated sensing element and moving said element until the aforementioned position of equal indicated readings is indicated for the sensing element;
locking the recalibration surface at said position of equal indicated readings so that the recalibration surface will always assume that position when the recalibration surface is moved into a position facing the sensing element;
moving the recalibration surface away from the sensing element in order that the sensing element might be contacted by a workpiece, or the like;
moving the recalibration surface back to the same position facing the sensing element; causing the sensing element to engage the recalibration surface;
determining whether the present indication for the sensing element is the same as it was when the recalibration surface was the previous time moved into engagement with the sensing element after the latter was calibrated.

10. A method of recalibrating an apparatus that has already been calibrated to align the center line of a rotatable spindle to which the apparatus is attached with the sensing element of the apparatus, comprising the steps of:
after the apparatus has been calibrated, moving a recalibration surface, which can be held at a fixed location with respect to the sensing element whenever the recalibration surface is moved to be in engagement with the sensing element, into a position facing the sensing element;
adjusting the position of the recalibration surface so that it moves into engagement with the calibrated sensing element and moves said element until a preselected sensing element position is indicated;
locking the recalibration surface at the preselected sensing element position so that the recalibration surface will always assume that position when the recalibration surface is moved into a position facing the sensing element;
moving the recalibration surface away from the sensing element in order that the sensing element might be contacted by a workpiece, or the like;
moving the recalibration surface back to the same position facing the sensing element; causing the sensing element to engage the recalibration surface;
determining whether the present indicated position for the sensing element is the same as it was when the recalibration surface was moved into engagement with the sensing element the previous time.

11. The method of calibrating an apparatus of claim 10, wherein when the sensing element preselected position is first indicated on an indicating means, that position is marked on the indicating means;
and if the present indicated position is not the same as the marked preselected position, the marked position is readjusted to the new present indicated position.

12. An apparatus for aligning the center line of a rotatable spindle with a workpiece location, wherein said apparatus comprises:
a body; means for connecting said body to a spindle; whereby said body rotates with that spindle; said body including a depending arm that extends down from said body;
a workpiece location sensing element connected directly to and supported by said depending arm for being contacted by the workpiece location to be sensed; said sensing element being supported by a bracket positioned and shaped such that said sensing element is at least in part below said body arm;
said body arm having a shank bore therethrough extending in a direction across said body arm direction of extension;

a location sensing element position indicator device including an indicating device operating stem extending out of said indicating device and extending through said shank bore and being directly connected to said location sensing element;

a shank surrounding said stem as it passes through said bore, and having an opening therethrough sized to permit sliding movement of said stem therethrough;

said shank being connected with said position indicator device such that positioning of said shank positions said device and said shank being itself positioned in said shank bore;

said depending arm including clamping means for clamping said shank stationary in said shank bore; said clamping means comprising shank engaging clamping pieces having bores therethrough, which bore are aligned with said shank bore and having clamping surfaces to engage said shank and defining said clamping piece bores; screw means passing through said clamping pieces to squeeze said clamping pieces against said shank.

13. The alignment apparatus of claim 12, wherein said clamping means comprises a clamping bore extending in said depending arm transversely to said shank bore; said clamping bore partially intersects said shank bore and said clamping pieces are in said clamping bore.

* * * * *